United States Patent [19]

Capello et al.

[11] 4,250,011
[45] Feb. 10, 1981

[54] ELECTRODE TOOL FOR ELECTROCHEMICAL MACHINING

[75] Inventors: Giuseppe Capello, Turin; Vittorio Giordano, Vigone; Renato Biondi, Moncalieri, all of Italy

[73] Assignee: Centro Ricerche Fiat S.p.A., Orbassano, Italy

[21] Appl. No.: 76,005

[22] Filed: Sep. 17, 1979

[30] Foreign Application Priority Data

Oct. 30, 1978 [IT] Italy .............................. 69489 A/78

[51] Int. Cl.³ ........................ B23P 1/02; C25D 17/10
[52] U.S. Cl. ............................... 204/224 M; 204/225; 204/286; 204/129.55; 204/129.6
[58] Field of Search ............. 204/224 M, 129.55, 225, 204/286, 224 R, 129.6

[56] References Cited

U.S. PATENT DOCUMENTS

| | | | |
|---|---|---|---|
| 2,577,644 | 12/1951 | Bartlett | 204/224 R |
| 2,902,584 | 9/1959 | Ullmann | 204/224 M UX |
| 3,696,014 | 10/1972 | Goodard et al. | 204/224 M X |
| 4,104,503 | 8/1978 | DiPiazza et al. | 204/224 M X |

FOREIGN PATENT DOCUMENTS 44-19363 8/1969 Japan ................................. 204/129.55

Primary Examiner—G. L. Kaplan
Assistant Examiner—D. R. Valentine
Attorney, Agent, or Firm—Sughrue, Rothwell, Mion, Zinn & Macpeak

[57] ABSTRACT

An electrode tool for the electrochemical machining of metal components, such as the cavities of internal combustion engine valves, is adapted for mounting on a machine tool mandrel and comprises a shaft upon which a flexible, elongate electrode is axially slidable, and which defines axially a conduit for conveying electrolytic fluid to the workpiece. The working end of the tool is constituted by a releasable electrode guide head which defines a part-circularly-curved electrode guide passage and the end portions of the conduit. The guide passage guides the axial sliding of the electrode so that an end portion of the latter projects radially relative to the axis of the tool by an angle determined by the radius of curvature of the passage. The guide head is interchangeable with at least one other guide head having a passage with a different radius of curvature.

9 Claims, 8 Drawing Figures

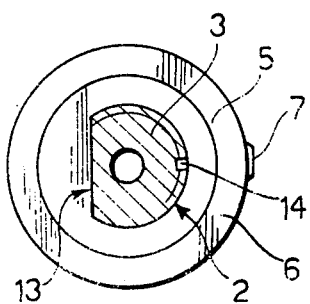
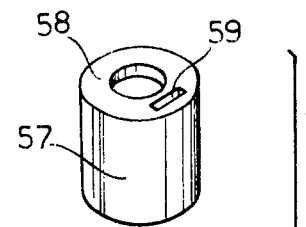
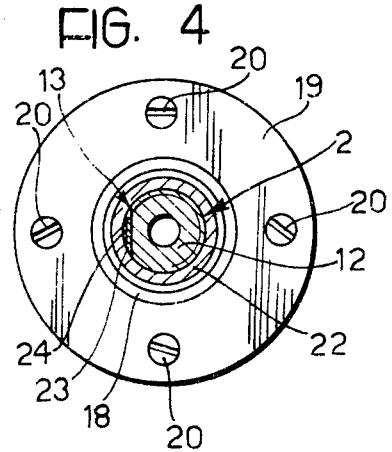
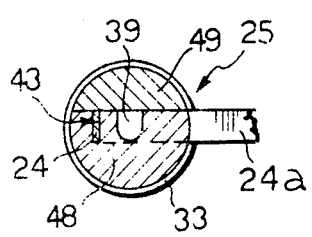

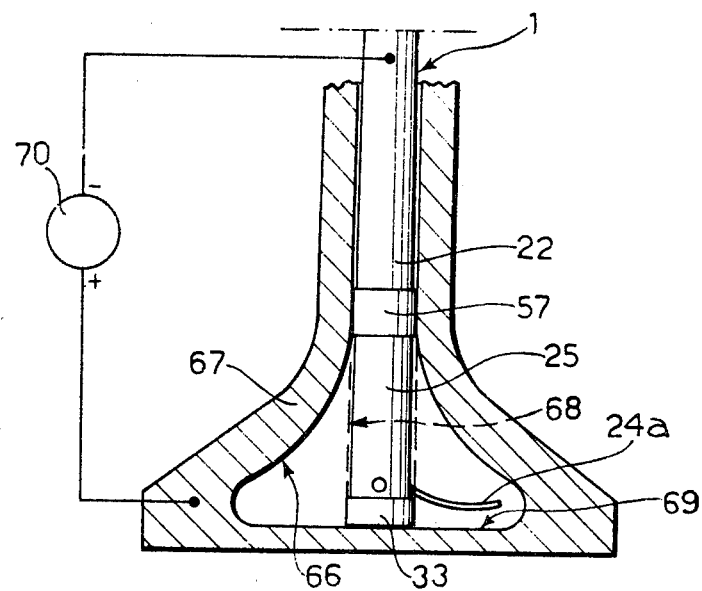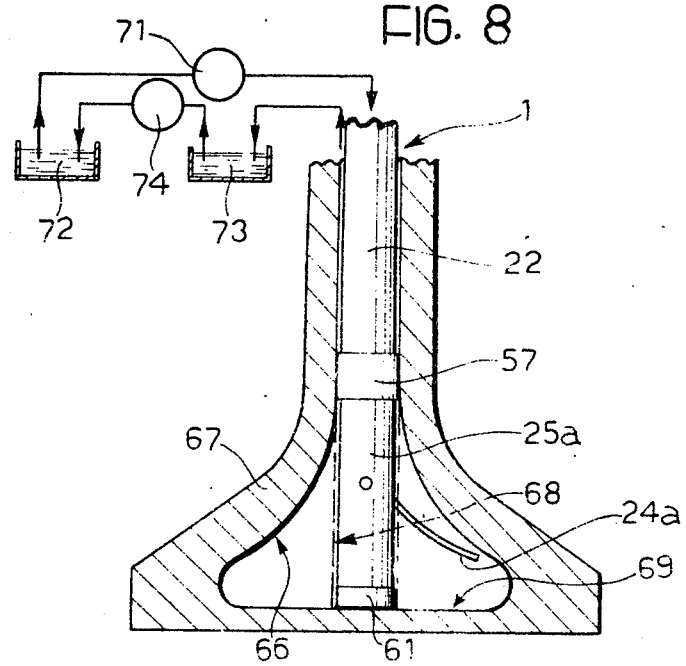

ELECTRODE TOOL FOR ELECTROCHEMICAL MACHINING

The present invention relates to electrode tools for electrochemical machining, and is concerned with an electrode tool particularly, but not exclusively, for use in the formation of undercut cavities in metal components.

In this specification the term 'undercut cavity' defines a mushroom-shaped cavity having an inlet opening with dimensions smaller than the largest dimensions of the cavity.

Previously, these undercut cavities in metal components, such as for example, the internal cavities of valves for internal combustion engines, have been formed by means of electrical discharge machining (EDM) carried out by an electrode device of known type, or by means of a known precision casting process.

Electrical discharge machining is an expensive process due both to the time necessary for such an operation, and the electrode consumption which occurs. Precision casting, is more economical than electrical discharge machining, but give rise to assembly problems which are not always easy to resolve. For example, the assembly of a forged component and a component which has been made by a precision casting involves a procedure which considerably increases the cost of the finished product. Moreover, precision casting has a relatively restricted application, since its use is limited to certain thicknesses of material and to certain types of metallic materials.

The object of the present invention is to provide an electrode tool which is able to work any type of metallic material, removing relatively large quantities of material in a relatively short space of time with substantially no consumption of the electrode.

According to the present invention there is provided an electrode tool for electrochemical machining, characterised in that the tool comprises an elongate support adapted at one end for connection to a machine tool mandrel; a conduit for conveying an electrolytic fluid to a workpiece, said conduit extending substantially axially through the support, and having an inlet connectable at said one end to a supply of said fluid, and an outlet adjacent the other, working end of the support, and an elongate flexible electrode extending substantially parallel to the conduit and being carried on the support, for axial sliding relative thereto, by means for regulating the axial position of the electrode relative to the support, the electrode extending for a portion of its length through a curved guide arranged adjacent the working end of the support, the guide guiding the axial sliding of the electrode such that an end portion of the latter extends through an opening adjacent the conduit outlet and projects substantially radially relative to the axis of the support by an angle determined by the radius of curvature of the guide.

The present invention will now be more particularly described, by way of example, with reference to the accompanying drawings, in which:

FIG. 2 is an exploded perspective view of a part of the tool of FIG. 1;

FIGS. 3, 4 and 5 are cross-sections taken along the lines III—III, IV—IV and V—V, respectively, of FIG. 1;

FIG. 7 shows, diagrammatically in partial section, an electrode tool according to the present invention at work, being connected with an electrical supply circuit, and FIG. 8 is a view similar to FIG. 7 showing the tool connected wth a supply circuit for an electrolytic fluid.

Figure 1:
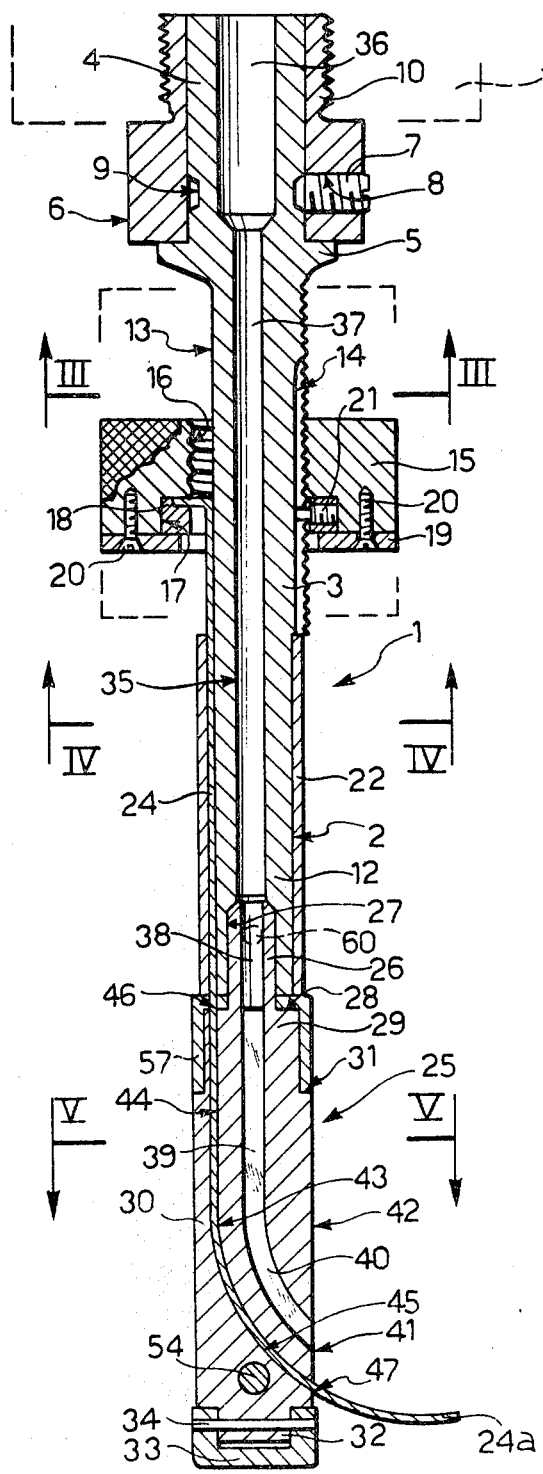
FIG. 1 is an axial section of an electrode tool according to the present invention.

Referring now to the drawings, FIG. 1 shows an electrode tool, generally indicated 1, comprising a cylindrical support shaft 2 having an externally threaded intermediate part 3 which is separated from a first cylindrical end portion 4 by an annular flange 5. The flange 5 forms a seating for a tubular union 6 which is close-fitted onto the cylindrical end portion 4, so as to abut the flange 5. The union 6 fixed axially relative to the end portion 4 by means of a screw 7 which is housed in a threaded radial hole 8 formed in the union 6. The innermost end of the screw 7 engages an annular groove 9 cut into the external surface of the end portion 4 of the shaft 2. The union 6 has an externally threaded end portion 10 which is adapted to engage a cooperating threaded hole in a tubular mandrel 11 of an operating machine (not shown), connecting the tool 1 to the latter.

The shaft 2 has a planar face 13 which extends axially along the intermediate part 3 and a second cylindrical end portion 12 opposite the first end portion 4 (FIG. 3). A groove 14, diametrically opposed to the planar face 13, is cut in the intermediate part 3.

The intermediate part 3 of the shaft 2 is provided with a ring nut 15 which has a threaded axial hole 16 formed with an annular end groove 17. The groove 17 rotatably houses a ring 18 which is retained in the groove 17 by an annular plate 19 fixed, by screws 20, to that end face of the ring nut 15 which faces the second end portion 12 of the shaft 2. A radial dowel 21 projects through the ring 18 and slidably engages the groove 14 so as to prevent rotation of the ring 18 relative to the shaft 2.

The second end portion 12 of the shaft 2 has a smaller diameter than the intermediate part 3 and is engaged within a cylindrical sleeve 22 made from an electrically insulating material. The sleeve 22 defines, with the planar face 13, an axially extending channel 23 (FIG. 4) which slidably houses an intermediate portion of an electrode 24.

The electrode 24 is in the form of a flexible strip with a substantially rectangular cross-section. One end of the electrode 24 is fixed to the ring 18, whilst the other, free, end is supported by a cylindrical guide head 25, which is coaxial with the shaft 2 and, with the latter, forms an elongate support for the electrode 24. As shown, particularly in FIGS. 1 and 2, the guide head 25 is releasably connected to the shaft 2 by means of a spigot 26 which engages a cooperating socket 27 formed axially in the free end of the second end portion 12 of the shaft 2.

The spigot 26 extends axially from a flat end surface 28 of a smaller diameter part 29 of the guide head 25. The smaller diameter part 29 is integral with a larger diameter part 30 of the head 25, the difference in diameters resulting in an annular shoulder 31. A cylindrical projection 32 extends axially from the free end of the larger diameter part 30. A cup-shaped spacer element 33 made from an electrically insulating material is releasably connected to the projection 32 by means of a radial bolt 34.

As shown in FIG. 1, the tool 1 is provided with an axial conduit, generally indicated 35, comprising an inlet portion 36 of relatively wide cross-section extending through the first end portion 4 of the shaft 2, an intermediate portion 37 extending through the remaining part of the shaft 2 to the socket 27, and a portion 38 which extends through the spigot 26, connecting the intermediate portion 37 with a portion 39 extending axially through the guide head 25. The end portion 40 of the conduit extending through the guide head 25 is curved and communicates with the exterior through an outlet aperture 41 formed in an external cylindrical surface 42 adjacent the end of the larger diameter part 30 of the head 25.

A guide passage 43 of substantially rectangular cross section is cut through the guide head 25. The passage 43 has a first portion 44 which is parallel to the conduit portion 39 extending through the guide head 25, and a second part-circularly-curved portion 45 which is parallel to the curved end portion 40 of the conduit 35. The first portion 44 of the guide passage 43 communicates with the outside at one end through an opening 46 which is formed in the surface 28 of the smaller diameter part 29 of the guide head 25 so as to be aligned with the channel 23, when the head 25 is connected to the shaft 2. The second portion 45 of the guide passage 43 communicates with the outside through an opening 47 formed in the surface 42 of the larger diameter part 30 of the guide head 25 between the opening 41 and the free end of the head 25. The electrode 24 is slidable within the passage 43, extending through the opening 47 in a substantially radial direction to provide a curved portion 24a having a radius of curvature substantially equal to that of the second portion 45 of the passage 43. The length of this end portion 24a is a function of the position of the ring nut 15 along the intermediate part 3 of the shaft 2.

As shown in FIG. 2, the electrode guide head 25 is made in such a way as to enable the curved portion 40 of the conduit 35 and the curved, second portion 45 of the passage 43 to be formed simply with a fixed radius of curvature, the value of which determines the working position of the end portion 24a of electrode 24 relative to the head 25. The guide head 25 is formed in two unequal parts 48, 49. The larger part 48 has a planar axial face 50 which extends from the base of the spigot 26 to the cylindrical projection 32 and abuts a corresponding planar face 51 on the smaller part 49.

The face 50 is formed with two grooves 52, 53 which, when the faces 50, 51 are in abutment, define the conduit portions 39, 40 and the passage 43, respectively.

The interconnection of the two parts 48, 49 of the guide head 25, with the faces 50, 51 in abutment, is effected at one end by means of a screw 54 which engages in respective radial holes 55, 56 made through the parts 48, 49, and at the other end by means of a cylindrical sleeve 57. The sleeve 57 is made from an electrically insulating material and is close-fitted onto the smaller diameter part 29 of the guide head 25 so as to abut the annular shoulder 31, the sleeve 57 having an annular flange 58 for abutment with the surface 28 and a hole 59 for alignment with the opening 46.

In order to prevent the accidental detachment of the guide head 25 from the shaft 2, the socket 27 in the latter is provided with a radial locking dowel 60 (FIG. 1) which cooperates with the external surface of the spigot 26.

Figure 6:
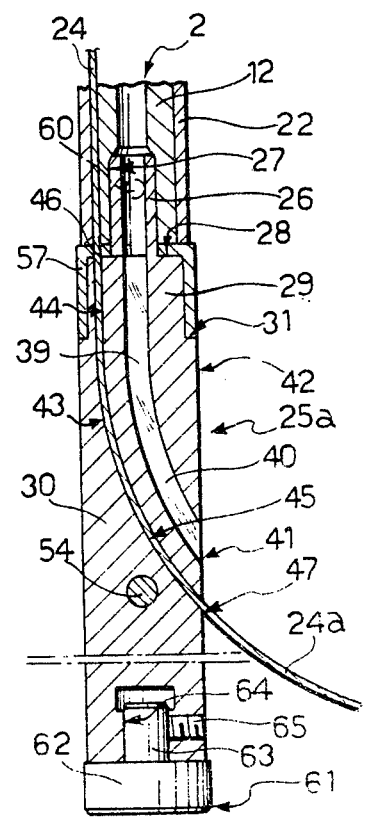
FIG. 6 is an axial section of a variant of a part of the tool of FIG. 1.

FIG. 6 shows a variant of the electrode guide head, generally indicated 25a, which differs substantially from the guide head 25 of FIGS. 1 and 2 only by the fact that the end portion 40 of the conduit and the second portion 45 of the passage 43 have a larger radius of curvature than the corresponding portions of the guide head 25 described above.

An electrically insulating spacer element 61 is connected to the free end of the guide head 25a, and comprises a disc 62 having an axial projection 63 which engages a cooperating axial blind bore 64 in the guide head 25a, the projection 63 being retained in the bore 64 by a radial locking dowel 65.

FIGS. 7 and 8 show the electrode tool 1 in use in the electrochemical machining of an undercut cavity 66 on the inside of, for example, the head of a valve 67 for an internal combustion engine. The machining is carried out through a substantially cylindrical hole 68 extending axially through the stem of the valve 67 and terminating in correspondence with the basal surface 69 of the cavity 66 which is to be formed.

During the formation of the substantially toroidal zone of the cavity 66 adjacent the surface 69, as shown in FIG. 7, the tool 1 used is provided with an electrode guide head 25 in which the passage 43 has a relatively sharp curvature, causing the end portion 24a of the electrode 24 to project substantially perpendicular to the axis of the tool 1. For the subsequent formation of the substantially frusto-conical zone of the cavity 66, as shown in FIG. 8, the tool 1 used is provided with an electrode guide head 25a in which the passage 43 has a relatively slight curvature, causing the end portion 24a of the electrode 24 to project substantially parallel to a generatrix of the frusto-conical surface being formed.

The cavity 66 is formed by rotating the mandrel 11 and, therefore, the tool 1, while simultaneously displacing the ring nut 15 so as to displace the ring 18 towards the sleeve 22 and cause a progressive lengthening of the end portion 24a of the electrode 24.

During the machining, the tool 1 is electrically insulated from the valve 67 by the sleeves 22, 57 and the spacer element 33 or 61 and, as shown in FIG. 7, is connected to the negative pole of a continuous current supply 70, the positive pole being connected to the valve 67.

During the machining, an electrolytic fluid consisting of a neutral saline solution is pumped into the cavity 66 through the conduit 35 by a pump 71, the fluid being taken from a supply tank 72 (FIG. 8). The electrical field which is set-up between the electrode 24 and the valve 67 causes an anodic reaction, resulting in the removal of metallic material from the valve 67 as that part of the valve 67 located adjacent the end portion 24a of the electrode 24 is decomposed to form metallic anions. The metallic anions combine with hydroxyl cations resulting from the electrolytic decomposition of the saline solution, forming a metal hydroxide which is precipitated and removed from the cavity 66 by the electrolytic fluid as it flows out through a radial clearance gap between the tool and the portion of the hole 68 extending along the stem of the valve 67. The electrolytic fluid which flows out from the valve 67 is fed into a decantation tank 73 (FIG. 8) from which, after precipitation of the metal hydroxide, it is drawn off, by a pump 74 and returned to the tank 72.

Simultaneously with the anodic reaction described above, a cathodic reaction develops within the cavity 66 and, as a result, hydrogen anions are produced which combine to form molecular hydrogen, the latter being taken off by the electrolytic fluid as free gas.

Monitoring of the cathodic and anodic reactions described above reveals that the removal of material from the valve 67 occurs without a corresponding removal of material from the electrode 24, which remains substantially unchanged.

Better control of the removal of metallic material from the surface of the cavity 66 is achieved if the electrical field is concentrated by coating the electrode 24 with an insulating film (not shown) which leaves only a small part of the end portion 24a of the electrode 24 uncovered. Alternatively, the whole of electrode 24 may be coated with an insulating film, and the end portion 24a may be provided with a bit (not shown), the form and dimensions of which may vary according to the surface which it is desired to form.

What is claimed is:

1. An electrode tool for electrochemical machining comprising:
    an elongate support shaft, connector means on one end of said shaft for connection to a machine tool mandrel;
    an electrode guide head releasably connected at one end thereof to the free end of said shaft;
    means defining a conduit extending substantially axially through said support shaft, said conduit having an inlet at said one end of said support shaft adapted for connection to a fluid supply means and an outlet adjacent the other end of said support shaft;
    an elongate, flexible electrode carried on said support shaft for axial sliding relative thereto, said electrode extending substantially parallel to said conduit; and
    means for regulating the axial position of said electrode relative to said support shaft, said means carrying said electrode on said support shaft; and
    said electrode guide head defining a curved guide therein having an opening adjacent said conduit outlet, said electrode being slidable through said guide such that an end portion of said electrode extends through said opening of said guide and projects substantially radially relative to the axis of said support by an angle determined by the radius of curvature of said guide.

2. An electrode tool as defined in claim 1, wherein said support shaft is covered for at least part of its length by an electrically insulating sleeve and an electrically insulating element is secured at the opposite end of said electrode guide head.

3. An electrode tool as defined in claim 1, wherein said shaft has a planar side face extending for a part of its length from said free end, and wherein said insulating sleeve surrounds said shaft in such a way as to cover a free end portion of the latter having a length which is less than that of said planar side face, said sleeve cooperating with said side face to define a channel in which said electrode is axially slidable.

4. An electrode tool as defined in claim 1, wherein said shaft includes an intermediate part upon which said regulating means are carried, said intermediate part being located between said one end and said insulating sleeve and wherein said planar side face extends to said intermediate part.

5. An electrode tool as defined in claim 4, wherein said regulating means comprise a ring nut, and wherein said intermediate part is externally threaded to cooperate with said ring nut, said electrode being connected to said ring nut so as to be rotatable, but fixed axially, relative thereto.

6. An electrode tool as defined in claim 3 wherein said guide comprises a guide passage having a first portion which, in use, constitutes an extension of said channel, and a second part-circularly-curved portion having a fixed radius of curvature and communicating with said opening adjacent said conduit opening.

7. An electrode tool as defined in claim 6, wherein said first portion of said guide passage communicates with said channel through an opening formed in a surface of said guide head which, in use, is adjacent said free end portion of said shaft.

8. An electrode tool as defined in claim 1, wherein said electrode guide head comprises two semi-cylindrical parts which abut each other along respective planar faces, one of said planar faces having two grooves which define, respectively, an end portion of said conduit and said guide passage, when said faces are in abutment, and releasable connecting means which maintain said parts in abutment.

9. An electrode tool as defined in claim 8, wherein said releasable connecting means include a cylindrical sleeve which is fitted over an end part of said guide head which, in use, is adjacent said shaft.

* * * * *